United States Patent [19]

Pond et al.

[11] Patent Number: 4,860,030

[45] Date of Patent: Aug. 22, 1989

[54] RESISTIVE PRINTHEAD ARRAYS FOR THERMAL TRANSFER PRINTING

[75] Inventors: Stephen F. Pond, Pittsford; Gary A. Kneezel; Robert V. Lorenze, both of Webster; Michael P. O'Horo; Martin S. Maltz, both of Rochester, all of N.Y.; Richard Kellerman, Media, Pa.

[73] Assignee: Xerox Corporation, Stamford, Conn.

[21] Appl. No.: 133,590

[22] Filed: Dec. 14, 1987

[51] Int. Cl.[4] .......... G01D 15/10; H05B 1/00

[52] U.S. Cl. .......... 346/76 PH; 219/216; 219/543; 400/120

[58] Field of Search .......... 346/76 PH; 219/216, 219/543; 400/120

[56] References Cited

U.S. PATENT DOCUMENTS

| | | | |
|---|---|---|---|
| 4,030,408 | 6/1977 | Miwa | 101/1 |
| 4,296,309 | 10/1981 | Shinmi et al. | 219/216 |
| 4,561,789 | 12/1985 | Saito | 400/120 |
| 4,626,872 | 12/1986 | Tameno | 346/76 PH |
| 4,668,962 | 5/1987 | Stallkamp | 346/76 PH |

FOREIGN PATENT DOCUMENTS

| | | | |
|---|---|---|---|
| 56-118879 | 9/1981 | Japan | 400/120 |
| 59-093367 | 5/1984 | Japan | 400/120 |
| 59-174370 | 10/1984 | Japan | 400/120 |

*Primary Examiner*—Clifford C. Shaw
*Assistant Examiner*—Gerald E. Preston
*Attorney, Agent, or Firm*—Mark Costello

[57] ABSTRACT

A thermal transfer printing device, including an ink donor supporting an ink meltable upon the application of a selected temperature, a printing head supporting a resistive heating element for generating the selected temperature at the ink donor, and means for bringing a final image support surface into contacting relationship with the ink donor in timed relationship to the application of the selected temperature to the ink donor including an electrically conductive heat sink layer, a heat resistant organic material having a very low thermal conductivity deposited on the heat sink layer and an array of resistors, supported on the heat resistant organic material, each resistor selectively controllable to apply a melting temperature to the meltable ink. The heat resistant organic material having a very low thermal conductivity is desirably a polyimide.

8 Claims, 4 Drawing Sheets

RESISTIVE PRINTHEAD ARRAYS FOR THERMAL TRANSFER PRINTING

The present invention relates to resistive thermal printheads, of the type useful in thermal transfer printing applications, and more particularly to structural and material improvements therefor.

BACKGROUND OF THE INVENTION

In thermal transfer printing, a final support surface such as a cut sheet of paper or the like is held closely adjacent to an ink donor surface, such as an ink carrying film, to allow the transfer of ink from the donor surface to the final support surface for printing an image. The inks used in thermal transfer printing are normally in a solid condition, and are subject to melting on the application of an appropriate amount of heat energy. In liquid state, the ink flows onto the final support surface. Upon removal of the source of heat energy, the spot of ink resolidifies and bonds to the final support surface, providing a visible image thereon. The process produces acceptable print quality, at reasonable cost and speed. It is a desirable feature of thermal transfer printing devices that they are very quiet relative to impact printers.

A thermal transfer printing device includes a printhead comprising a thermal element composed of an array of selectably controllable resistive heat producing elements, each element constituting a pixel in a line to be produced on the final support surface. The array is supported in closely spaced relationship to an ink donor surface to supply heat energy to melt the solid ink deposited thereon. The array is generally arranged to print across the width of an entire sheet, so that a 300 spot per inch printer will have approximately 2650 elements to print across an 8.5 inch wide sheet. A voltage is controllably applied to each individually addressable resistive element, in accordance with a stored electronic image, to energize the element to melt the ink on the donor surface in an area local to the element to form a dot on the support surface. Relative movements of the printhead, the ink donor surface and the sheet allow the movement of the imaging process along the sheet to produce a series of lines to form the complete image.

Resistive heating element arrays are commonly formed in a layering process in which a resistor is deposited on a substrate using thin or thick film techniques. The substrate is typically 1mm thick alumina ($Al_2O_3$) which provides an electrically insulating, thermally conductive substrate. Between the alumina and the resistors is a glaze layer, comprising a thermally isolating glass or ceramic material about 50 $\mu$thick. The alumina substrate is adhesively bonded to an electrically and thermally conductive metallic base, such as aluminum, about 5 mm thick, for strength, and also to provide a heat sink for the printhead and an electrical ground for the resistor array. The glaze layer provides thermal isolation so that the resistor can reach a peak temperature of 300°–400° C. within a millisecond of the application of a power input of about 0.5 Watts, but also allows enough thermal conductivity for the resistor to cool below the melting point of the ink within a few milliseconds after power is removed from the resistor. The alumina substrate serves to disperse the heat from the glaze layer to a sink very quickly, and is a useful substrate material in fabricating the resistive heating element arrays. These structures are not optimal, however, because of the several layers required to fabricate the printhead (four counting the adhesive layer required to bond the alumina to the aluminum), inefficiency in heat transfer characeteristics and limitations to printing resolution.

Conventional thermal printheads, whether fabricated by thick film or thin film techniques, rely upon the glaze layer to thermally isolate the resistors from the alumina substrate. The glaze layer, typically Corning 0080 glass or its equivalent, and about 50 microns in thickness, provides enough thermal isolation that, when driven, the resistors reach an operating temperature of around 300° C. and cool, upon the removal of heating power, to a temperature less than the melting point of the ink at approximately 60° C. in a few milliseconds. The thickness of the glaze layer is dictated by these requirements, and by the fact that the thermal conductivity of Corning 0080 glass is relatively high, in the range of $2 \times 10^{-3}$ cal/sec-cm-° C. The glaze layer material is isotropic, so that a spherically symmetric thermal bubble (isotherm) propagates from a point source of heat (the resistor). The isotherm propagates in accordance with $$\left(\frac{tk}{\rho C}\right)^{\frac{1}{2}}$$

where k is thermal conductivity;

t is time; and $\rho C$ is the volumetric specific heat.

The time scale of operation of the heating element is set by the requirement that the isotherm, with a temperature necessary to melt the ink, and a size necessary to produce a fully formed pixel, propagate through the ink donor film. The period taken for this to occur is about 2.5 milliseconds. During this same period, however, the same isothermal surface diffuses through the glaze layer, and heat is lost to the alumina sink. The thickness of the glaze layer is selected in part to minimize heat loss to the sink from occurring. However, the isotropic nature of the material also allows lateral diffussion of heat. Lateral diffusion of heat in the glaze layer limits the resolution attainable with thermal transfer printing.

In U.S. Pat. No, 4,296,309 to Shinmi et al. the thermal printhead site generally comprises an aluminum base, an alumina substrate over the base, a glass layer over the alumina substrate and supporting a resistive heater element, an electrode driving the resistive heater element and a protective overcoating. Japanese Patent No. 59-174370 shows a thermal printhead site including an iron or aluminum heat dissipating layer, an insulating layer, a heating element, a conductive layer connected to the electrode and a protective overcoating. United States Patent No. 4,561,789 to Saito shows a similar thermal printhead site. United States Patent No, 4,030,408 to Miwa shows resistive elements seated in recesses in a ceramic base and covered with a protective overcoating.

Polyimides are organic heat resistant materials, having a lower thermal conductivity than conventional glaze layer materials. Additionally, polyimides may be applied in thin layers and are photo definable so that they are useful in thin film deposition techniques of manufacturing. U.S. Pat. No. 4,561,789 to Saito shows the use of polyimides in a porous printhead for thermal ink transfer printing suggesting the use of a polyimide insulation film between an electrode and an aluminum substrate in that configuration, but does not teach how the polyimide layer can be used as an improvement over a glaze layer for the control of the melting isotherm expansion in printheads.

To achieve the higher resolutions desirable for high quality printing, a large number of resistor elements per unit of length is desirable, since the greater the number of addressable locations in the image, the finer the image may be made, with fewer jagged edges and print artifacts. A known method of resistor spacing, referred to hereinafter as interdigitation, places the resistors in two closely spaced parallel arrays, each resistor element in an array being placed in a position opposite to a space between adjacent resistors in the opposing array. The close spacing of the array and the width of the printing nip, in combination with the dot size produced by each element, allows the appearance of a straight line produced by the resistors when the appropriate time delay between the two arrays is used to drive the resistors. Overdriving of the resistive heating elements is not required to heat the area between the resistors to melt ink on the donor surface in the space between the resistors, thereby increasing life and decreasing power supply requirements. Interdigitated arrays of this type are shown in Japanese Patent No. 56-118879, Japanese Patent No. 59-93367 and U.S. Pat. No, 4,030,408 to Miwa. The structure of these arrangements, however, requires multiple levels of circuitry for connection of the resistors to the common bus and ground plane. It would be desirable if an arrangement could directly connect the resistors to a common bus, connected directly to a massive current carrying metallic substrate.

SUMMARY OF THE INVENTION

In accordance with the present invention, there is provided a printhead for thermal printing applications including a thermal printing element comprising a metallic substrate, a thermal insulating layer of a relatively thin layer of an organic type heat resistant material having a very low thermal conductivity, such as polyimide, deposited in a thin layer on the metallic base and supporting an array of resistive heating elements, with each resistive element connected to an integrated circuit driver and and a common bus. The use of a thin polyimide thermal insulating layer slows the lateral thermal diffusion of heat generated at the resistors through the thermal insulating layer in comparison to devices having a relatively thick and highly thermal conducting ceramic or glass insulating layer. The relatively low thermal conductivity allows the use of a thinner thermal insulating layer than previously used. Thus, the heat energy reaches the ink carrying film and the metallic substrate heat sink prior to significant lateral expansion. Polyimides may also be deposited directly on the metallic substrate and are easily used in the fabrication of resistive thermal printing devices.

In accordance with another aspect of the invention, the use of the thin polyimide layer allows the resistors to be readily connected through a common bus directly to the electrically conducting massive metal base. The direct connection of the resistive heating elements to the massive metal base allows the two rows of interdigitated heating heating elements to be close to one another without requiring a wide common bus either between them or constructed as an additional layer. The ability to use a thin photo definable thermal barrier layer, such as polyimide, also enhances the manufacturability of this interconnection scheme.

These and other aspects of the invention will become apparent from the following description used to illustrate a preferred embodiment of the invention read in conjunction with the accompanying drawings in which:

FIGS. 1A and 1B schematically show the location of the printhead in a thermal printer, particularly with respect to the ink donor film, paper and print roller;

Figure 5:
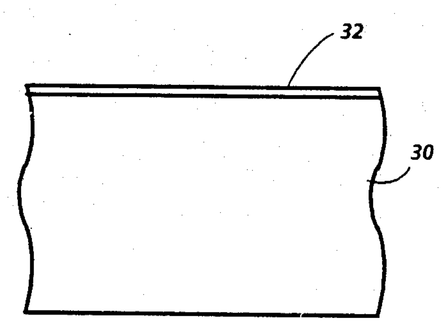
Figure 6:
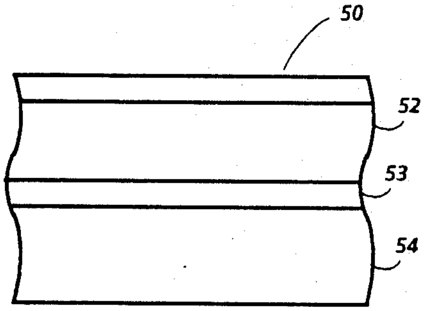
FIG. 6 PRIOR ART
Figure 7:
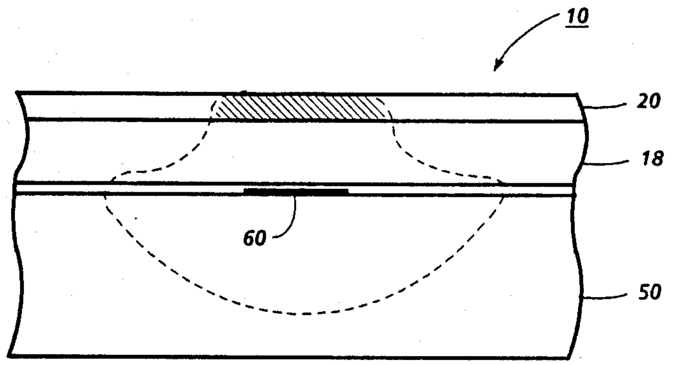
FIG. 7 PRIOR ART
Figure 8:
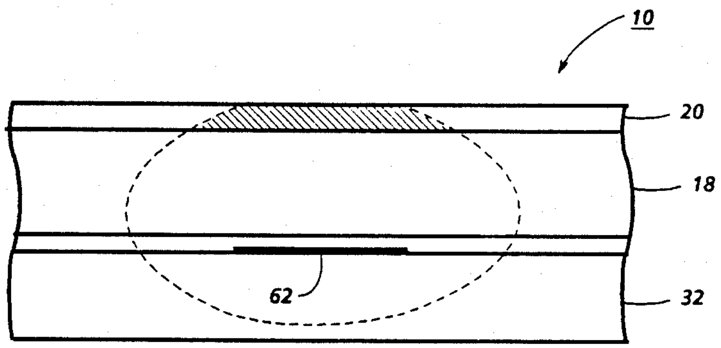

FIGS. 5 and 6 respectively show cross sectional views of the printhead resistors in the prior art and for the present invention; and FIGS. 7 and 8 show the heat transmission characteristics of the resistors in the prior art and for the present invention.

Figures 1A, 1B:
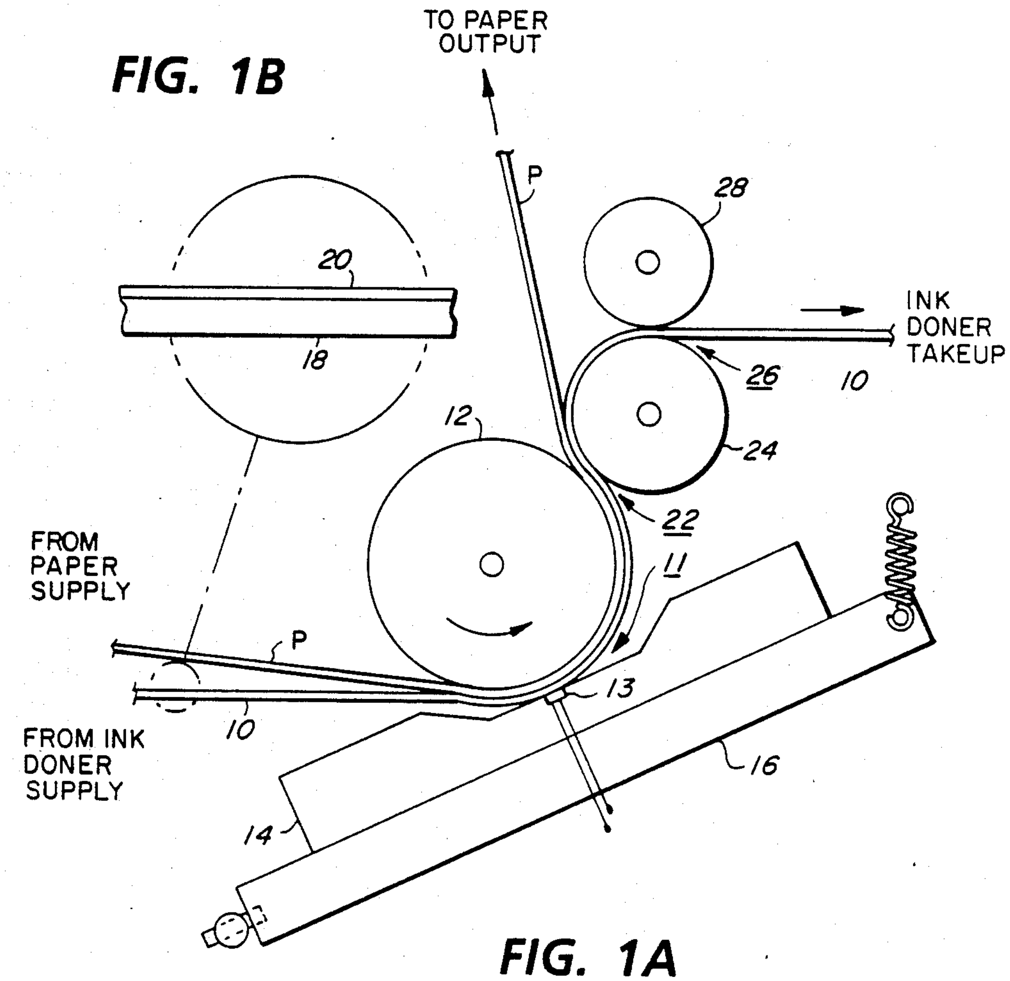

Referring now to the drawings where the showings are for the purpose of describing a preferred embodiment of the invention and not for the purpose of limiting same, FIG. 1 somewhat schematically shows an arrangement for thermal ink printing using an ink donor film. Ink donor film 10 is directed from a supply towards a printing nip 11 comprising printing roller 12, and thermal transfer element 13 in printhead 14. In accordance with the operation of the printer, paper P to receive a printed image is also directed to printing nip 11, between the ink donor film 10 and printing roller 12. The printhead may be supported on a suitable mounting bracket 16, which, in the described embodiment, is spring biased into close position with printing roller 12.

Ink donor film 10, best shown in the sectional drawing 1B, is comprised generally of a substrate 18, coated with a pigmented wax layer 20. The substrate or carrier 18, shown in the section 1B is generally a polyester or cellulosic material, often of the type of material commonly used as a dielectric in paper capacitors, ranging in thickness from about 5–15 μm. The pigmented wax 20 is somewhat hard, but has a low melting viscosity when heated to temperatures between 60–80° C. Typical waxes are a blend of a hard wax such as Carnuba wax with a softer ester wax, softening oils, and a pigment such as carbon black for black printing.

Figure 2A:
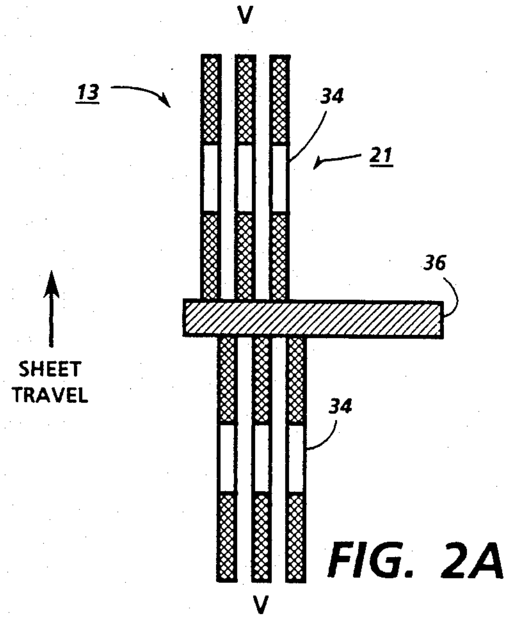
FIGS. 2A, 2B, 3A and 3B show alternate arrangements for the resistive printing array on the printhead.

Referring to FIGS. 1 and 2A, as ink donor film 10 and paper P contact at printing nip 11, thermal element 13 on printhead 14 is controlled to apply heat to the non-inked side of the ink donor film 10, in order to image-wise melt the ink in contact with paper P. Thermal element 13 is comprised of a resistor array 21 arranged in a line perpendicular to the direction of sheet travel past the array. Each resistor is individually controllable to form a pixel of a final image. In practice, to achieve a desirable image quality, the array is arranged with over 200–400 resistive elements per inch, for a total of at least 1700–3200 elements for printing across a short edge first fed 8.5 ×11 inch sheet. In accordance with whether the resistor is activated, or heated to an ink melting condition, a spot of ink will be deposited on the sheet at the resistor location. Continual operation of the resistor array as the sheet and donor film move past the resistor array provides an image on the entire sheet in accordance with an electronic representation of the image transmitted to the printer control. Subsequent to the ink being melted, the paper P is separated from the ink donor film 10, to leave the majority of ink on the paper. Ink donor film 10 is directed through a drive nip 26 formed by drive roller 24 and a pinch roll 28.

Figure 2B:
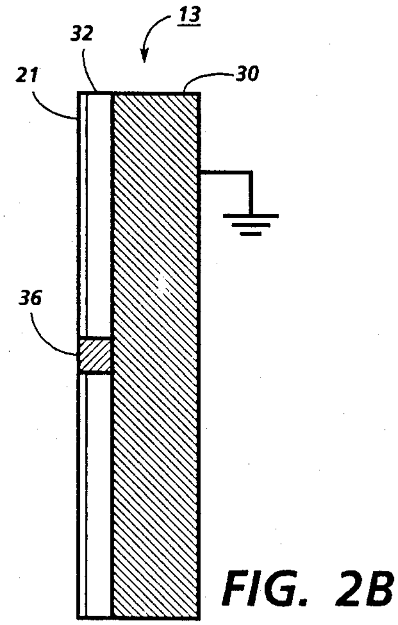
Figure 3A:
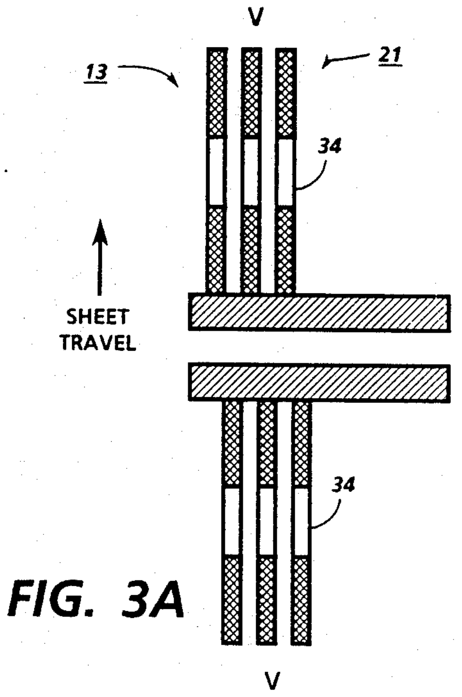
Figure 3B:
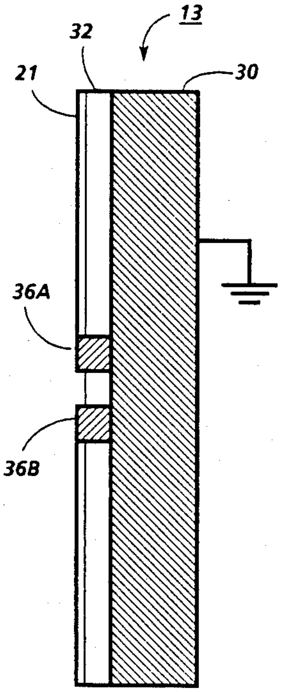
Figure 4:
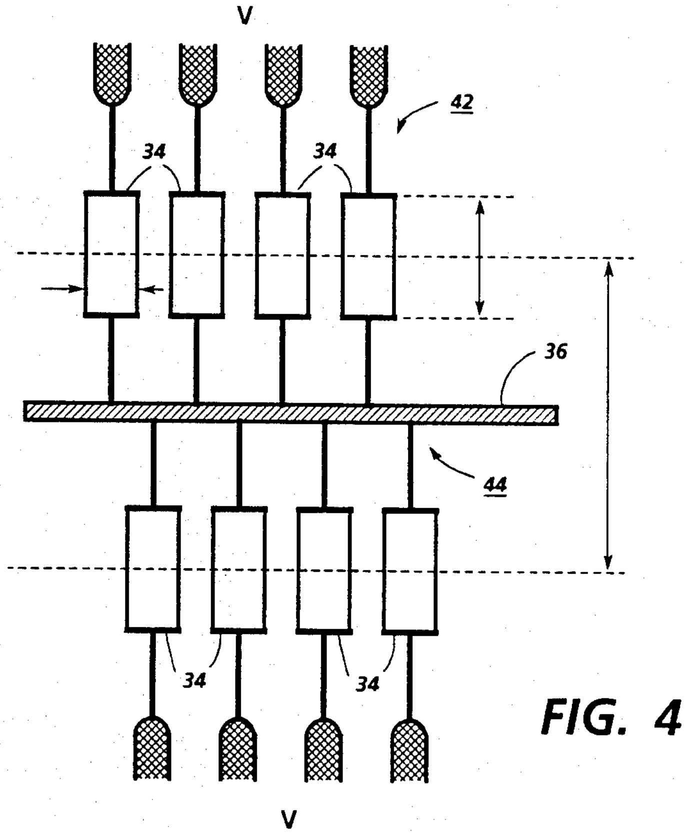
FIG. 4 shows a desirable electrode geometry for the array.

As shown in FIG. 2A and 2B, to achieve the close spacing required for high resolution and high addressability devices, particular care must be taken in the arrangement of the resistors. Thermal element 13 is comprised of a metallic base 30 of a highly thermally and electrically conductive material such as aluminum, copper or nickel supporting a polyimide insulating layer 32 (to be further discussed hereinbelow) and a resistor array 21, comprised of resistors 34 with selectably controllable connections to a power supply V+, deposited onto the surface of the polyimide layer 32, and connected through a single bus 36. Resistor members 34 may be comprised of a material having suitable thin film heating characteristics, such as tantalum nitride (TaN) or Nichrome (a trademark of Driver Harris Co. for a nickel chrome composition) for thin film manufacturing techniques. FIGS. 3A and 3B indicate a variation of the arrangement in which each parallel array of resistors is connected to a separate bus, labeled **36*a* and 36*b*, each bus still being connected directly through the polyimide insulating layer to the metallic base 30. A thermally insulative material, such as for example polyimide, may separate the two busses. With reference to FIG. 4, the relative spacing of the resistors 34 in an array 21 may be appreciated in an embodiment of a thermal element suitable for printing up to 400 spots per inch. The distance between resistor rows is approximately 0.016", while the resistor dimensions are each about 0.004"×0.002", and spaced about 0.0025" apart in a given row. Electrodes 42 connect each resistor element 34 to an integrated circuit driver (not shown) indicated generally as V, and each resistor is connected with an electrode 44 to a common bus 36**, which, as previously noted, is connected to the metallic substrate.

In accordance with one aspect of the invention, resistors 34 are arranged in an interdigitated fashion, so that the half of the resistive elements are supported on one side of a common bus, while the remaining resistive elements are supported on the other side of the common bus. Each resistor is then placed in a position opposite to a space between two resistors on the opposite sides of the bus. Thus, proper control of each array of resistors in close succession allows a line to be completed by the second array, filling in the line started by the first array to obtain the resolution and addressability equivalent to a single row. A particularly compact arrangement is made possible by connection of the resistors to a common bus 36, which is in turn connected through polyimide layer 32 to the metallic base 30. Direct connection of the resistor low potential leads to the metal substrate through the polyimide layer avoids the need for layered circuitry, which would be required to provide a suitably large current return path, and allows the doubled addressability shown in interdigitated arrays. Additionally, the lower lead densities required by the arrangement reduces fabrication complexity.

In accordance with another aspect of the invention, and as shown in FIG. 5, the resistor array 21 is supported on a substrate comprising a heat resistant material having a very low thermal conductivity on the order of 5 ×10-4 cal/sec cm ° C., such as polyimide insulating layer 32, deposited over the metallic base 30. In comparison to the prior art substrates exemplified in FIG. 6, which generally include a thermally insulating glaze layer 50, over a thermally conductive and electrically insulating alumina layer 52, and an adhesive layer 53 bonding the alumina to a thermally conductive and electrically conductive metallic supporting substrate 54, the construction and fabrication of the novel substrates is substantially less complex.

FIG. 7 demonstrates the heat diffusion characteristics at the ink donor/thermal element interface of the prior art substrate. Heat generated at a resistor 60 diffuses through the air gap and the ink donor substrate and ink, to melt the ink for printing. To obtain an appropriately shaped dot of melted ink to apply to the paper, the diffusion of heat (illustrated by a dashed line at a 60° C. melting isotherm) occurs over a period of time, during which time heat also diffuses laterally through the glaze layer 50. As the heat diffuses laterally through the glaze layer, there is a tendency for a concurrent undesirable spreading of the spot of melted ink. In order to maintain isolation between resistors in an array, the adjacent resistor must be located at a spacing which will not be affected by this lateral diffusion of heat. This lateral diffusion occurs before the heat diffuses into the region of the heat sink (not shown in FIG. 7) where it can be rapidly diffused through the heat sink in a downward direction without further lateral diffusion. While it would be desirable to reduce the thickness of glaze layer to cause a more rapid flow of heat through the glaze layer to the substrate, the thermal conductivity of typical glaze layer materials (such as $SiO_2$) are typically such that the heat would dissipate through the layer to the substrate too quickly if the layer was significantly thinner, not allowing enough time to efficiently heat the ink to a melting temperature. By contrast, and as shown in FIG. 8, the present invention using a layer of a polyimide material 5–30 microns thick such as for example, Kapton or Pyralin, both manufactured by the DuPont Corporation, or other similar polyimide type materials having heat resistant characteristics and very low thermal conductivity, the melting isotherm does not rapidly expand from the resistor through the thermally insulating polyimide layer 32 in the manner seen for the prior art glaze layer materials. This has two advantages: the resistor site surrounded by the polyimide material and the area adjacent thereto conducts heat away from the resistor at a slower rate, so less material is required for thermally isolating the resistor site, and the thinner layer allows the melting isotherm boundary to reach the metallic heat sink earlier, before lateral conduction occurs. In combination, the result is that less lateral conductivity occurs in the same period, with the advantage that the melting ink spot is more carefully controlled, and less power is required.

It will no doubt be appreciated that variations in the described arrangements within the scope of the invention are possible which achieve the desired result. Thus for example, while the described arrangement finds particular use with respect to thermal transfer printing applications using an ink donor roll, other applications of the invention are possible within such as for thermal printing on treated paper sensitive to the application of heat to the paper to form an image. It is intended that all such variations and uses are included insofar as they come within the scope of the appended claims or equivalents thereof.

We claim:

1. In a thermal transfer printing device, including an ink donor supporting an ink meltable upon the application of a selected temperature, a printing head supporting a resistive heating element for generating the selected temperature at the ink donor, and means for bringing a final image support surface into contacting relationship with the ink donor in timed relationship to the application of the selected temperature to the ink donor, said resistive heating element comprising:

a heat sink layer comprising a metallic support member;

a heat resistant organic material having a very low thermal conductivity deposited on said heat sink layer, having a thickness and thermal conductivity selected to prevent substantial lateral dissipation of heat energy from the resistors through the heat resistant organic material layer before the ink is melted; and an array of resistors, supported on said heat resistant organic material and each selectively controllable to apply a melting temperature to the meltable ink.

2. The printing device as defined in claim 1 wherein said heat resistant organic material having a very low thermal conductivity is a polyimide.

3. A thermal printhead for imagewise application of heat to a surface comprising:

a heat sink layer comprising a metallic support member;

a heat resistant organic material having a very low thermal conductivity deposited on said heat sink layer, having a thickness and thermal conductivity selected to prevent substantial dissipation of heat energy from the resistors through the heat resistant organic material layer before the ink is melted; and an array of resistors, supported on said heat resistant organic material and each selectively controllable to apply a selected temperature to said surface for image production.

4. The printhead as defined in claim 3 wherein said heat resistant organic material having a very low thermal conductivity is a polyimide.

5. The printing head as defined in claim 3 wherein each said resistor in the array is connected through a common current bus extending through said polyimide layer to the metallic support member.

6. The printing head as defined in claim 3 wherein said resistors in said array are arranged in two parallel closely spaced rows, the resistors of each row connected through a common current bus extending through said polyimide layer to the metallic support member.

7. The printing head as defined in claim 3 wherein said resistors in said array are arranged in two parallel closely spaced rows, each row of resistors respectively connected through a separate current bus extending through said polyimide layer to the metallic support member.

8. A thermal printhead for imagewise application of heat to a surface comprising:

a heat sink layer comprising a conductive metallic support layer;

an insulating substrate layer deposited on said support layer;

an array of resistors, supported on said insulating substrate, each resistor selectively controllable to apply a melting temperature to the surface;

each resistor in said array electrically connected through a common current bus to the conductive metallic support layer.

* * * * *